United States Patent [19]

Thompson

[11] 3,911,376

[45] Oct. 7, 1975

[54] GALLIUM ARSENIDE INJECTION LASERS

[75] Inventor: George Horace B. Thompson, Harlow, England

[73] Assignee: International Standard Electric Corporation, New York, N.Y.

[22] Filed: Oct. 4, 1971

[21] Appl. No.: 186,127

[30] Foreign Application Priority Data

Oct. 15, 1970 United Kingdom.............. 49051/70

[52] U.S. Cl. ................ 331/94.5 H; 357/16; 357/18

[51] Int. Cl.² ............................................ H01S 3/00

[58] Field of Search............ 331/94.5 H; 317/235 N; 357/16, 18

[56] References Cited

UNITED STATES PATENTS 3,691,476 9/1972 Hayashi ............................ 331/94.5

*Primary Examiner*—Edward S. Bauer
*Attorney, Agent, or Firm*—John T. O'Halloran; Menotti J. Lombardi, Jr.; Edward Goldberg

[57] ABSTRACT

A semiconductor injection laser includes a thin inner GaAs p-n junction layer between two outer GaAlAs layers which are backed by further thin outer GaAlAs layers with a heavier doping of AlAs. This reduces optical losses. Optical energy is further confined within the inner layers and the lasing threshold reduced by added outer GaAs layers of low electrical and thermal resistivity.

12 Claims, 20 Drawing Figures

Inventor
GEORGE H. B. THOMPSON
By Edward Goldberg
Attorney

Inventor
GEORGE H. B. THOMPSON
By Edward Goldberg
Attorney

Inventor
GEORGE H. B. THOMPSON
By Edward Goldberg
Attorney

Inventor
GEORGE H. B. THOMPSON
By Edward Goldberg
Attorney

GALLIUM ARSENIDE INJECTION LASERS

BACKGROUND OF THE INVENTION

1. Field of the Invention

This invention relates to heterostructure GaAs - GaAlAs injection lasers.

2. Description of the Prior Art

In a conventional double heterostructure GaAs - GaAlAs injection laser having only a single layer of GaAlAs on each side of the GaAs layer the light that is generated is guided between the two heterojunctions.

The volume of the active region where the recombination occurs can be reduced by reducing the thickness of the GaAs layer containing the p-n junction, in which case the density of injected carriers for any given current flow is correspondingly increased thereby giving rise to a reduction in the lasing threshold current density. Since the GaAs layers are electrically in series with the p-n junction it is desirable to make them of low electrical resistivity material. This low resistivity is secured by a relatively high doping concentration, but this results in a relatively high optical loss. It is therefore desirable to design the optical guiding properties of the laser so that the optical energy shall be conveyed in a tightly bound mode in which the optical energy is confined almost exclusively to the GaAs layer. This is achieved by employing a relatively large mole percentage of AlAs in the GaAlAs layers which has the effect of reducing their refractive index to a value appreciably beneath that of the GaAs layer. However, if the thickness of the GaAs layer is reduced appreciably beneath a value of about 0.5 microns, then the GaAs is unable to support an increasingly significant proportion of the optical energy. Thus with a conventional double heterostructure any reduction of the lasing threshold achieved by reducing the thickness of the GaAs layer beneath a certain value is completely offset by the increase of the lasing threshold attributable to the fact that more of the optical energy has to be conveyed through more lossy material.

SUMMARY OF THE INVENTION

According to the present invention there is provided a heterostructure GaAs - GaAlAs injection laser having a layer of GaAs sandwiched between two layers of GaAlAs, the GaAs layer containing the p-n junction of the laser, wherein at least one of said GaAlAs layers forms an inner GaAlAs layer which is backed by an outer GaAlAs layer having a greater mole percentage of AlAs than the inner layer. Preferably the laser is provided with inner and outer GaAlAs layers on both sides of the GaAs layer. The outer GaAlAs layer or layers may be further backed by layers of GaAs.

The use of inner and outer GaAlAs layers ameliorates the problem of the prior art insofar as it provides an optical guide which is thicker than the active region. In certain applications it can be an advantage to employ a structure having an optical guide width greater than that which is necessary merely to achieve an adequate confinement of the light within the comparatively lossless regions of the structure. This is because the greater width provides a greater directionality of light output from the laser, and directionally is an important factor in instances such as the design of lasers suitable for launching light into optical waveguides. The inner layer or layers of GaAlAs are chosen to have a low doping so that their optical loss shall be correspondingly low. This low doping concentration makes the resistivity of these layers relatively high and so they are made as thin as is consistent with making the total width of the inner GaAlAs layer and the GaAs layer sufficient to handle the bulk of the optical energy. The relative mole percentages of AlAs in the inner and outer GaAlAs layers are chosen on the one hand to provide a sufficient difference of band-gap between the GaAs layer and the inner GaAlAs layer to provide adequate confinement of the injected carriers within the GaAs layer, and on the other hand to provide as large as possible a difference in refractive index between the inner and outer layers so that the optical energy shall not spread unduly much into the material of the outer GaAlAs layers. Under these circumstances it is then possible to construct the outer GaAlAs layers of relatively highly doped material in order to reduce to a minimum their electrical resistivity. Ideally the outer layers of GaAlAs should not be thicker than is necessary to contain the optical energy within the inner layers and should be directly laid on to a heat sink material of higher thermal conductivity. This presents practical difficulties, particularly in respect to making contact with material having a relatively high aluminum content. For this reason the GaAlAs layers may be backed by further layers of GaAs which has a lower electrical resistivity and a much lower thermal resistivity than GaAlAs. This enables the use of much thinner outer GaAlAs layers and hence a higher resistivity material can be tolerated constituted by lightly doped material affording a minimum of optical loss.

Illustrative embodiments of the invention will now be described with reference to the accompanying drawings.

DESCRIPTION OF THE PREFERRED EMBODIMENTS

Figure 1:
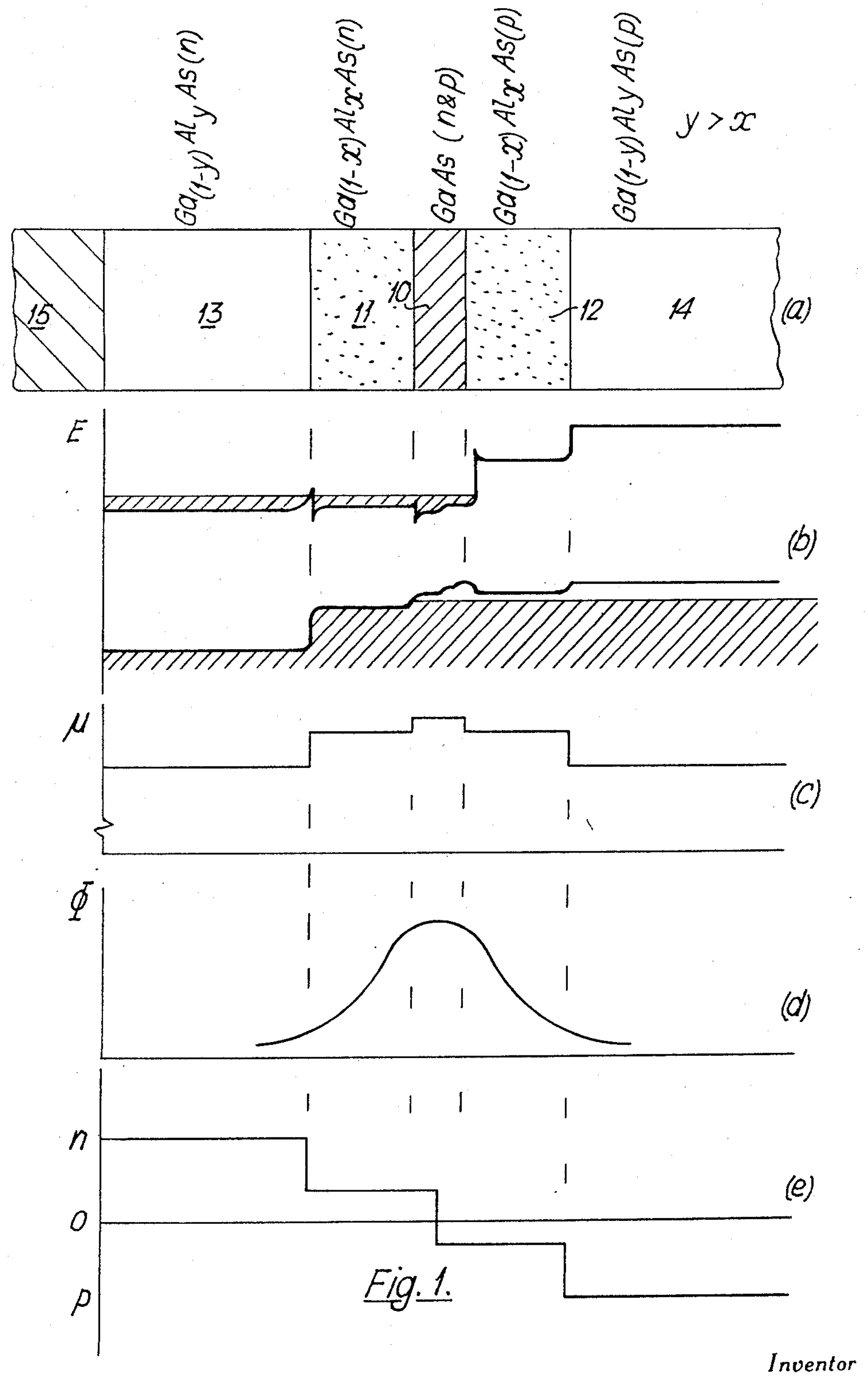
FIGS. 1*a*, 2*a*, 3*a* and 4*a* are diagrammatic sectional representations of four different embodiments.
FIGS. 1*b*, 2*b*, 3*b* and 4*b* show their energy diagrams.
FIGS. 1*c*, 2*c*, 3*c* and 4*c* show their refractive index profiles.
FIGS. 1*d*, 2*d*, 3*d* and 4*d* show the distribution of optical energy.
FIGS. 1*e*, 2*e*, 3*e* and 4*e* show their carrier concentration profiles.

In FIG. 1a there is shown an injection laser having a thin active region in the form of a layer 10 of GaAs containing a p-n junction. This layer of GaAs is bounded by two inner layers 11 and 12 of GaAlAs containing approximately 5 mole percent AlAs. In this way a heterojunction having a difference in band-gap of approximately 0.07 eV is provided between the active region 10 and each of the inner layers 11 and 12, and this results in the adequate confinement of injected carriers within the layer 10. The carrier concentration of the inner layers 11 and 12 is made less than $5 \times 10^{17}$ carriers/cm$^3$ so that little free carrier absorbtion occurs. The total thickness of the three layers 10, 11 and 12 is a little greater than 1 micron, and they are backed by outer layers 13 and 14 of GaAlAs containing a greater percentage of AlAs in the range 10 to 35%, and about $2 \times 10^{18}$ carriers/cm$^3$. The device is grown on a substrate 15, and on the opposite side is connected to a heat sink (not shown).

One of the inner GaAlAs layers may be omitted from the above described structure with little degradation in performance, particularly if the optical guide provided by the active region and the remaining inner GaAlAs layer is relatively narrow. Such a structure is illustrated in FIG. 2 where the layer 12 has been omitted so that there is one less layer on the side of the active region nearest the heat sink which would be sited on the side of the structure opposite the substrate.

Ideally the outer layers of GaAlAs should not be thicker than is necessary to contain the residual optical energy not conveyed by the inner layers. This value is typically about 0.5 microns. This is too thin to be convenient for making direct connection to a heat sink because of the difficulties of contacting and so the outer GaAlAs layers of the structures illustrated in FIGS. 1 and 2 are considerably thicker. The problem can however be overcome by backing the outer layers of GaAlAs by further layers of GaAs. Such a structure is illustrated in FIG. 3. Basically the structure of FIG. 3 only differs from that of FIG. 1 by the presence of additional outer layers 16 and 17 of GaAs whose electrical and thermal conductivity is greater than that of the layers 13 and 14. There is also the difference that the layers 13 and 14 can be made much thinner so as to have a thickness lying typically in the region of 0.2 to 0.5 microns. On account of this thinness of these layers the optical loss of the device can be further reduced by making them of material having the same doping concentration as the inner layers 11 and 12 without providing the complete device with an excessive electrical resistance.

Figure 2:
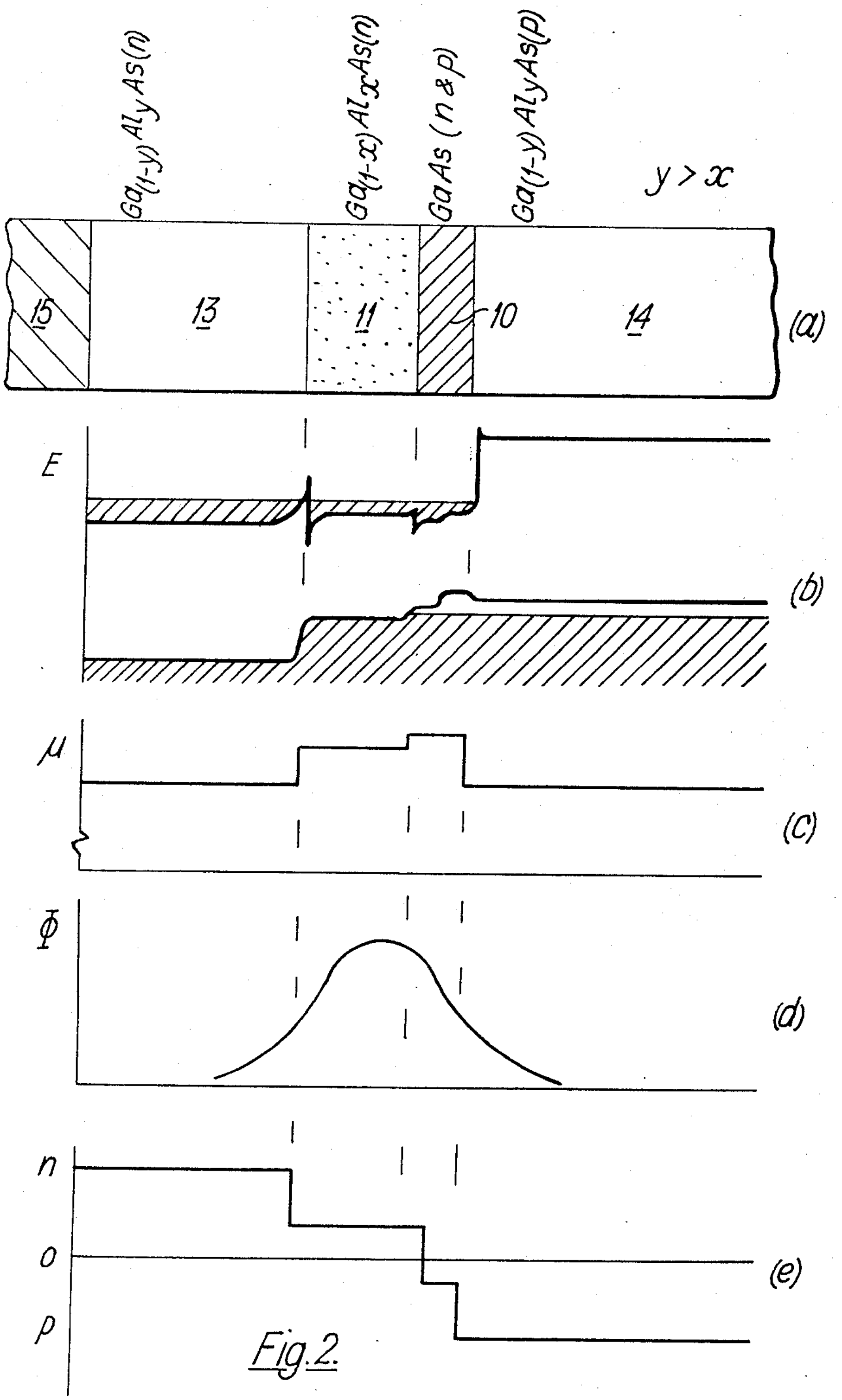
Figure 3:
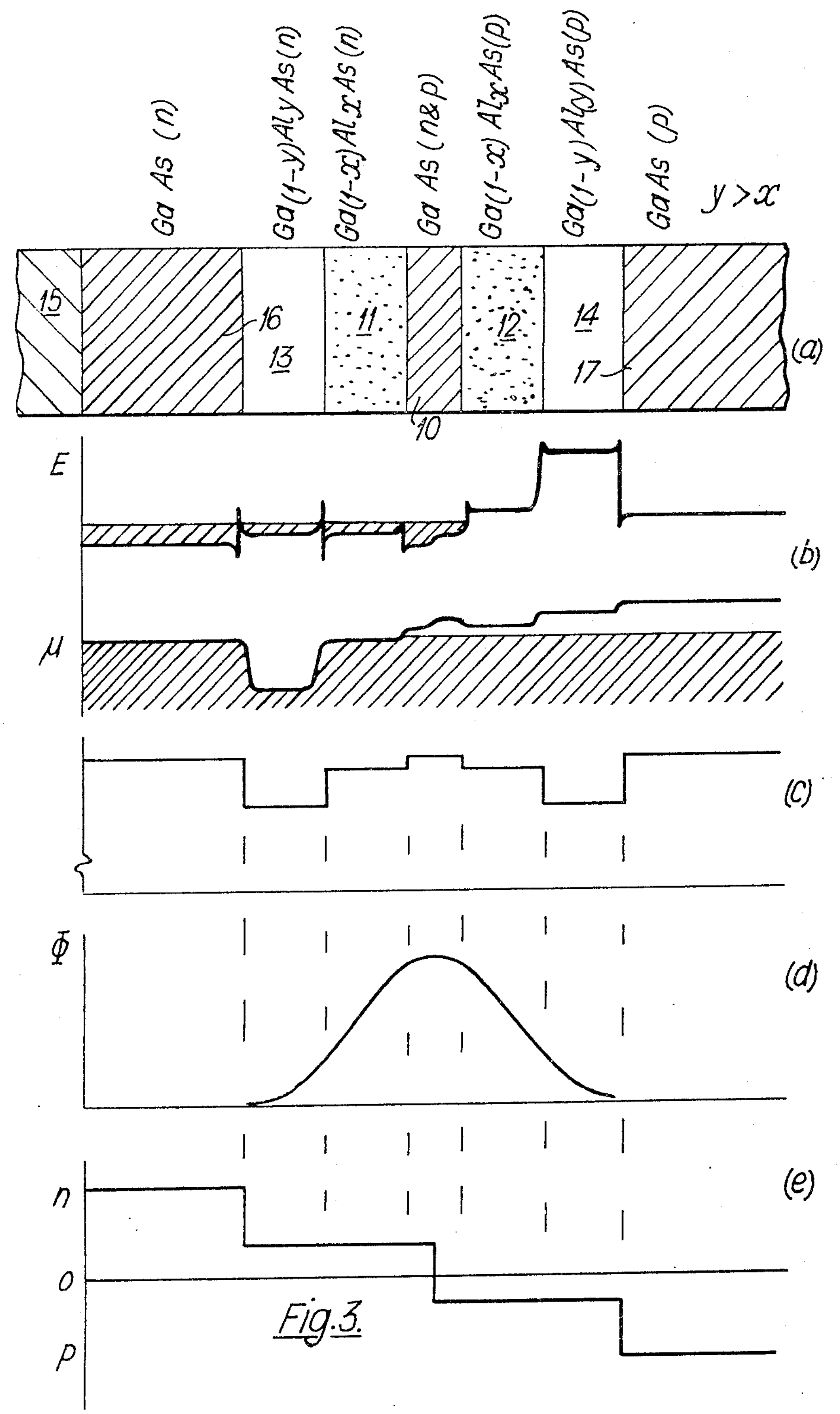
Figure 4:
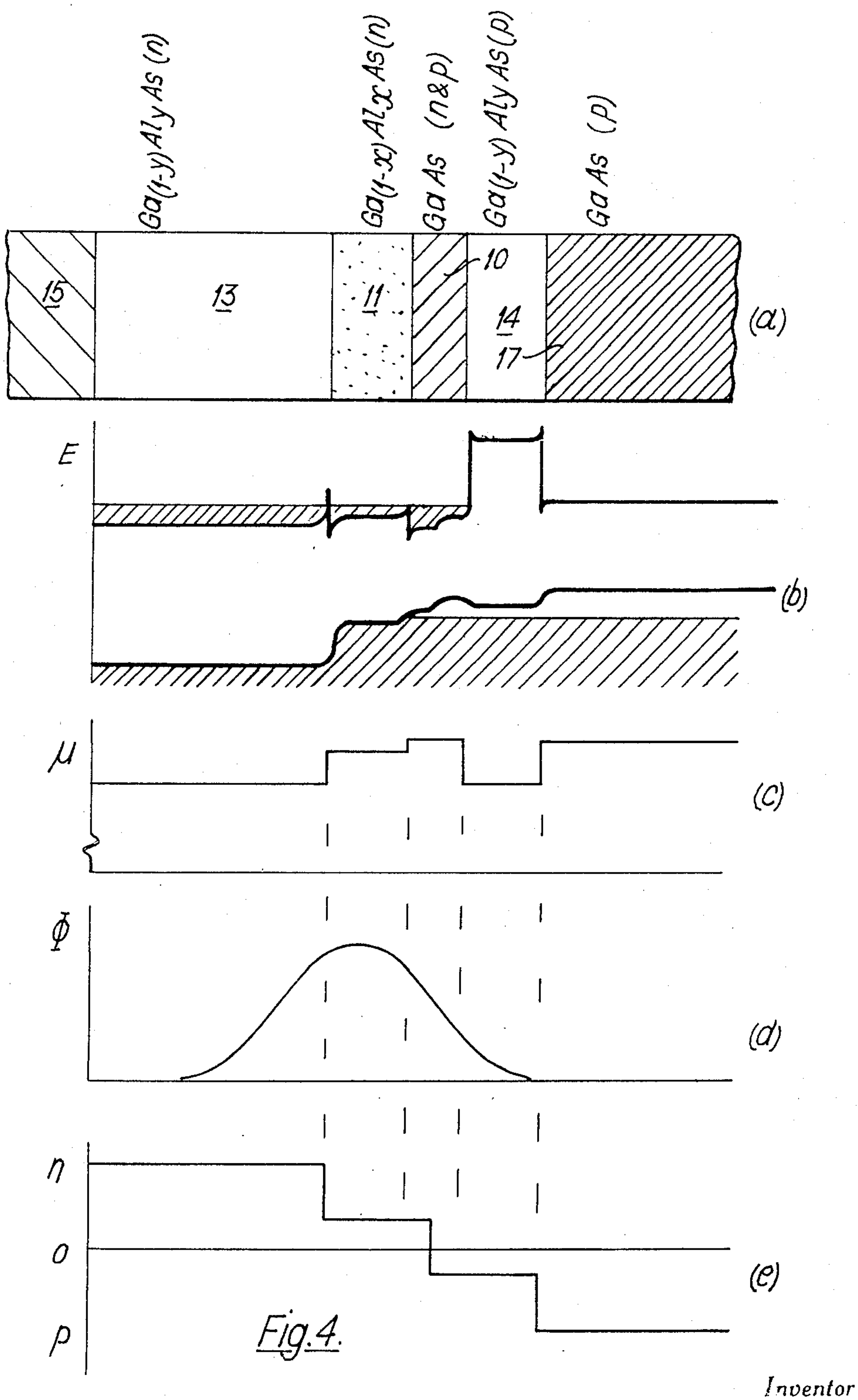

An additional layer of GaAs may be used for the same purpose to improve the performance of the structure depicted in FIG. 2. FIG. 4 shows a structure similar to that depicted in FIG. 2, but modified by the addition of a single outer layer 17 of GaAs on the side of the active region of GaAs nearest the heat sink.

It is to be understood that the foregoing description of specific examples of this invention is made by way of example only and is not to be considered as a limitation on its scope.

What is claimed is:

1. A heterostructure GaAs - GaAlAs injection laser comprising a layer of GaAs sandwiched between two layers of GaAlAs, the GaAs layer containing the p-n junction of the laser and being sufficiently thin to provide carrier confinement, at least one of said GaAlAs layers being an inner layer, and an outer GaAlAs layer over said inner layer and having a greater mole percentage of AlAs than said inner layer, said two GaAlAs layer being of sufficient thickness to provide optical confinement therein.

2. The device of claim 1 wherein both of said GaAlAs layers about said GaAs layer are inner layers and including respective outer GaAlAs layers over each inner layer having a greater mole percentage of AlAs than the respective inner layers.

3. The device of claim 1 including an additional outer GaAs layer and a heat sink, the other said layers being bonded to said heat sink via said additional layer of GaAs.

4. The device of claim 1 wherein said layers of GaAs and GaAlAs are disposed on a substrate at a side opposite said heat sink.

5. The device of claim 2 wherein said inner and outer layers comprise respectively $Ga_{(1-x)}Al_xAs$ and $Ga_{(1-y)}Al_yAs$ where $y > x$.

6. The device of claim 5 wherein said inner layer contains about 5 mole percent of AlAs and said outer GaAlAs layer contains a mole percentage of AlAs of between 10 to 35 percent.

7. For use in a semiconductor injection laser, a semiconductor body including first and second heteroboundaries defining a first active region therebetween for confining recombination radiation, third and fourth heteroboundaries disposed between said first and second heteroboundaries, thereby defining a second active region for confining carriers, the bandgap of said second active region being smaller than that of said first active region, and a p-n junction located between said third and fourth heteroboundaries.

8. The device of claim 7 including first and second opposite conductivity type wide bandgap regions positioned on opposite sides of said first active region defining said first and second heteroboundaries, said first active region including third and fourth opposite conductivity type narrow bandgap regions on opposite sides of said second active region defining said third and fourth heteroboundaries.

9. The device of claim 7 including first and second opposite conductivity type wide bandgap regions on opposite sides of said first active region, said first active region including said second active region of smaller bandgap than said first active region.

10. The device of claim 9 wherein said second active region is disposed nearer to one of said wider bandgap regions.

11. The device of claim 8 wherein the difference in bandgap between said wide bandgap regions and said first active region is greater than that between said first and second regions.

12. The device of claim 8 wherein said first and second wide bandgap regions comprise respectively $Ga_{(1-y)}Al_yAs(n)$ and $Ga_{(1-y)}Al_yAs(p)$, said third and fourth regions comprise $Ga_{(1-x)}Al_xAs(n)$ and $Ga_{(1-x)}Al_xAs(p)$ respectively, and said second active region comprises GaAs, where $y > x$.

* * * * *